United States Patent
Morikawa

Patent Number: 5,960,122
Date of Patent: Sep. 28, 1999

[54] METHOD OF AND APPARATUS FOR PROCESSING DIGITAL IMAGE DATA

[75] Inventor: Seiichiro Morikawa, Kanagawa-ken, Japan

[73] Assignee: Fuji Photo Film Co., Ltd., Kanagawa-ken, Japan

[21] Appl. No.: 08/541,977

[22] Filed: Oct. 10, 1995

Related U.S. Application Data

[63] Continuation-in-part of application No. 08/156,842, Nov. 24, 1993, abandoned.

[30] Foreign Application Priority Data

Dec. 28, 1992 [JP] Japan ................................. 4-347517

[51] Int. Cl.$^6$ ................................................ G06K 9/40
[52] U.S. Cl. .......................... 382/274; 382/275; 358/458
[58] Field of Search .................................. 382/254, 274, 382/276, 275; 358/456, 458, 463

[56] References Cited

U.S. PATENT DOCUMENTS

| | | | |
|---|---|---|---|
| 4,578,714 | 3/1986 | Sugiura et al. | 358/457 |
| 4,809,082 | 2/1989 | Yamaguchi et al. | 358/455 |
| 4,860,118 | 8/1989 | Arimoto | 358/451 |
| 5,083,210 | 1/1992 | Reilly et al. | 358/456 |
| 5,123,059 | 6/1992 | Hirosawa et al. | 382/272 |
| 5,229,864 | 7/1993 | Moronaga et al. | 358/433 |

FOREIGN PATENT DOCUMENTS

| | | |
|---|---|---|
| 310021A3 | 4/1989 | European Pat. Off. . |
| A58156266 | 9/1983 | Japan . |
| A1237887 | 9/1989 | Japan . |
| 3-62783A | 3/1991 | Japan . |
| 3-68083 | 3/1991 | Japan . |
| A3122774 | 5/1991 | Japan . |
| 4-232016 | 3/1994 | Japan . |

OTHER PUBLICATIONS

Patent Abstract of Japan, vol. 13, No. 570 (P–977) Dec. 9, 1989 –JPA 01237887 –Fuji Photo Film Co.
Patent of Abstract Japan, vol. 7, No. 276 (E–215) Dec. 9, 1983 –JPA 58156266 –Matsushita Giken KK.
Patent Abstract of Japan, vol. 15, No. 335 (P–1242) Aug. 26, 1991 –JPA03122774 –Mitsubishi Electric Corp.

*Primary Examiner*—Jon Chang
*Attorney, Agent, or Firm*—Sughrue, Mion, Zinn, MacPeak & Seas, PLLC

[57] ABSTRACT

An apparatus for processing a digitized image signal includes a random-number generator for generating random-number data, an adder for adding input digital image data and random-number data outputted from the random-number generator, into sum data, and an image processor for processing the sum data from the adder.

2 Claims, 4 Drawing Sheets

METHOD OF AND APPARATUS FOR PROCESSING DIGITAL IMAGE DATA

This is a Continuation-in-Part of application Ser. No. 08/156,842 filed Nov. 24, 1993 now abandoned.

BACKGROUND OF THE INVENTION

1. Field of the Invention

The present invention relates to a method of and an apparatus for processing image data to reproduce a halftone image, and more particularly to a method and an apparatus in which said image processing is effected on digitized image data.

2. Description of the Related Art

Image processing based on digital image signals tends to produce a distorted output signal due to a quantizing error even when the input signal varies smoothly. Distortions of the output signal appear as a pseudo contour (tone jumps) on the reproduced image, resulting in a reduction in the image quality. Particularly, in an image processing system which repeats image processing in a multi-stage configuration, repeated information drops tend to occur due to the limited accuracy in arithmetic operations. In such a system, any reduction in the image quality due to a quantizing error is the most serious problem.

The quantizing error may be lowered by reducing the duration of each quantizing step. However, such a solution requires an expensive analog-to-digital converter that is used to convert an input signal to a digital signal, or a large-scale image processing system.

SUMMARY OF THE INVENTION

It is therefore an object of the present invention to provide a method of and an apparatus for processing a digitized input image signal, capable of producing a processed output image with a smooth gradation by reducing distortions in signal processing, without reducing the duration of each quantizing step.

According to an aspect of the present invention, there is provided a method of processing a digital image signal, comprising the steps of adding input digital image data and random-number data into sum data, and processing the sum data. The random-number data may be chosen from uniform random numbers, random numbers corrected depending on the input digital image data, or random numbers corrected depending on an image reading magnification with which the input digital image data is read.

According to another aspect of the present invention, there is also provided an apparatus for processing a digital image signal, comprising a random-number generator for generating random-number data, an adder for adding input digital image data and random-number data outputted from the random-number generator, into sum data, and an image processor for processing the sum data from the adder.

The apparatus may further include a multiplier for multiplying the random-number data outputted from the random-number generator by coefficient data depending on the input digital image data, or by coefficient data depending on an image reading magnification with which the input digital image data is read, and applying product output data, rather than the random-number data outputted from the random-number generator, to the adder.

With the arrangement of the present invention, random-number data is added to a digitized input image data. The sum data is equivalent to smoothed image data which would be produced when the duration of each quantizing step is reduced. Since the sum data is processed, image signal distortions caused by the image processing are suppressed and tone jumps of a resultant image are reduced. Therefore, the reproduced image has a smooth gradation.

If the random-number data represent random numbers corrected depending on the input digital image data, then the magnitude of changes in the value of the sum data is limited to a small range. Consequently, the effect of the random-number data can be reduced in a high-density image area where the image tends to be sandy and rough, i.e., any tone jumps are less conspicuous. It is thus possible to control the effect of added random-number data in an image area where tone jumps are less conspicuous such as a high-density image area and in an image area where tone jumps are more conspicuous. If the random-number data represent random numbers corrected depending on the image reading magnification, then when the image reading magnification is larger, i.e., when the image is of a nature with less conspicuous tone jumps, the effect of random-number data can be reduced.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
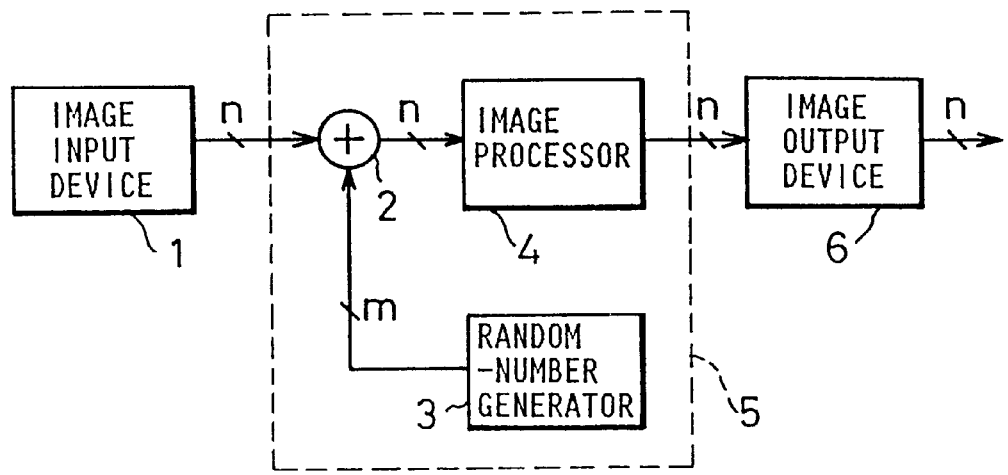
FIG. 1 is a block diagram of an image processing apparatus according to a first embodiment of the present invention, shown in combination with image input and output devices.

As shown in FIG. 1, an image processing apparatus, generally designated by the reference numeral 5, according to a first embodiment of the present invention is connected between an image input device 1 and an image output device 6.

The image input device 1, which may comprise a scanner, for example, reads an image on an original or the like, converts the read image to a digital image signal with an A/D converter, and produces n-bit digital output data corresponding to each pixel of the image. The n-bit digital output data from the image input device 1 is applied to the image processing apparatus 5. The image processing apparatus 5 processes the n-bit digital output data supplied from the image input device 1 and outputs the processed n-bit digital data to the image output device 6, which may comprise an image recorder, for example.

The image processing apparatus 5 comprises a random-number generator 3, an adder 2 for adding the n-bit digital data outputted from the image input device 1 and m-bit random-number data outputted from the random-number generator 3, and an image processor 4 for processing output data from the adder 2. The number n of bits of the digital data outputted from the image input device 1 is greater than the number m of bits of the random-number data outputted from the random-number generator 3 (n>m).

Figure 2:
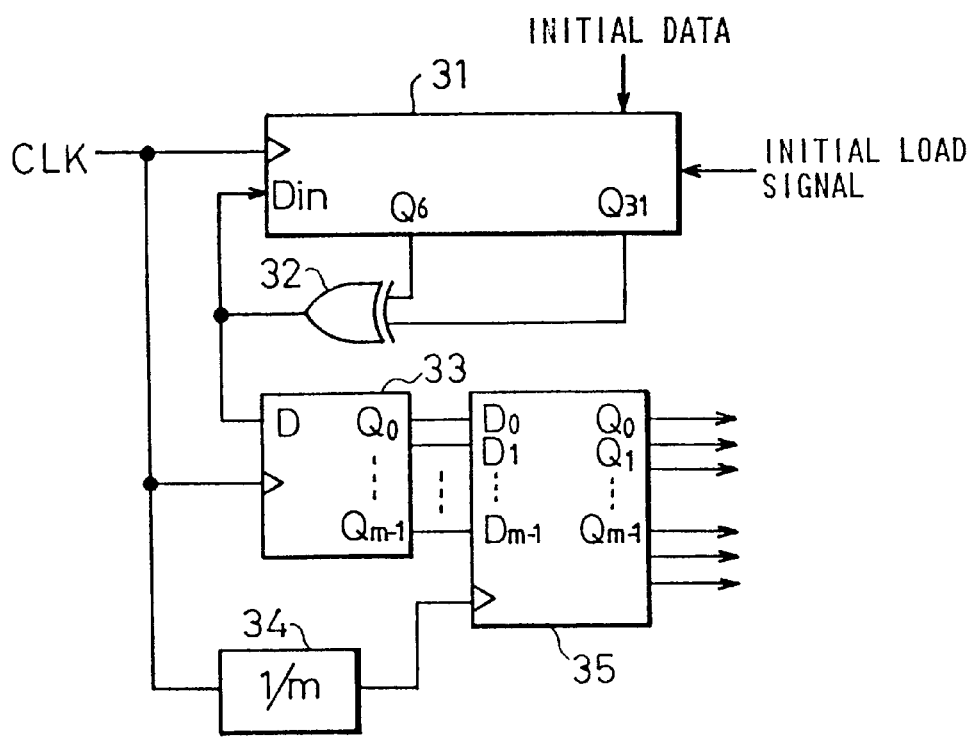
FIG. 2 is a block diagram of a random-number generator in the image processing apparatus shown in FIG. 1.

As shown in FIG. 2, the random-number generator 3 comprises a 32-stage shift register 31, an arithmetic unit 32, such as an exclusive-OR gate, for adding, by way of mod-2 addition, an output signal from a 6th stage of the shift register 31 and an output signal from a final 31st stage of the shift register 31, an m-bit shift register 33 for converting an output signal from the arithmetic unit 32 to m-bit parallel data, a frequency-divider 34 for frequency-dividing clock pulses by m, and a latch 35 for latching output data from the m-bit shift register 33 in response to a strobe pulse outputted by the frequency divider 34. The random-number generator 3 puts together m 1-bit random numbers each of a 32-bit period, and generates m-bit uniform random-number data $(-2^{m-1} \sim 2^{m-1}-1)$.

The adder 2 is arranged to limit its sum output data to n-bit output data based on (n+1)th bit data such that when the (n+1)th bit is "1" and the nth bit is "0", all of the n bits are set to "1" like FFF(H), and when the (n+1)th bit is "1" and the nth bit is "1", all of the n bits are set to "0" like 000(H).

The m-bit random-number data outputted from the random-number generator 3 is added to the n-bit digital data outputted from the image input device 1 by the adder 2, and the sum data from the adder 2 is delivered to the image processor 4 for image processing.

The addition of the output data from the image input device 1 and the random-number data from the random-number generator 3 into image data to be processed is equivalent to a reduction in the duration of each quantizing step, as described below, even though the duration of each quantizing step in the A/D converter in the image input device 1 remains the same. Since the image processor 4 is supplied with data with a reduced quantizing step duration, the image processor 4 can produce processed image data capable of producing an output image expressed in a smooth range of gradations with suppressed tone jumps.

Figure 6:
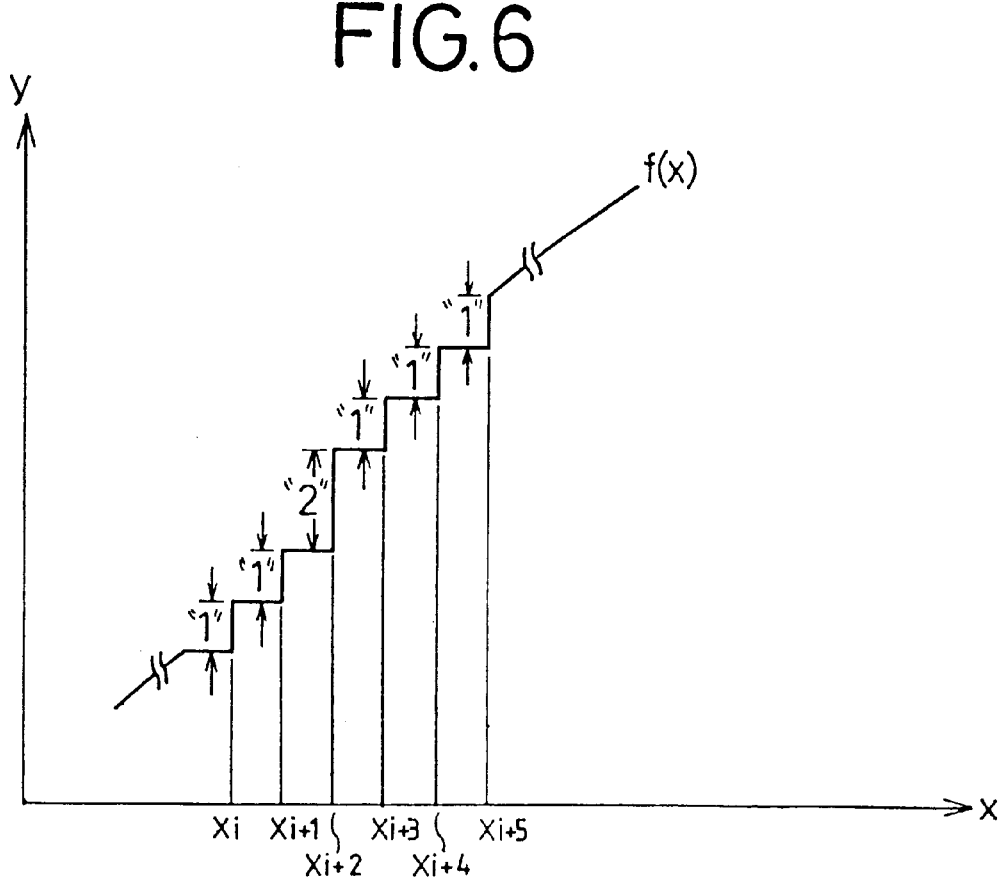
FIG. 6 is a diagram illustrative of the relationship between input and output signals in the image processing apparatus according to the first embodiment of the present invention.

More specifically, the output data is discrete data and can only be represented by integers. It is assumed as shown in FIG. 6 that the input and output data of the image processing apparatus 5 are related to each other as indicated by a function f(x). The input data which is sampled and quantized is represented by xi. Conventional output data yi to which no random-number data is added is indicated as original output values in the following table:

| Original output value | $y_{k+1} - y_k$ | Output value with random number added | $\hat{y}_{k+1} - \hat{y}_k$ |
|---|---|---|---|
| $y_i = f(x_i)$ | | $\hat{y}_i = \frac{1}{3}(f(x_{i-1}) + f(x_i) + f(x_{i+1}))$ | |
| $y_{i+1} = f(x_{i+1})$ | 1 | $\hat{y}_{i+1} = \frac{1}{3}(f(x_i) + f(x_{i+1}) + f(x_{i+2}))$ | 4/3 |
| $y_{i+2} = f(x_{i+2})$ | 1 | $\hat{y}_{i+2} = \frac{1}{3}(f(x_{i+1}) + f(x_{i+2}) + f(x_{i+3}))$ | 4/3 |
| $y_{i+3} = f(x_{i+3})$ | 2 | $\hat{y}_{i+3} = \frac{1}{3}(f(x_{i+2}) + f(x_{i+3}) + f(x_{i+4}))$ | 4/3 |
| $y_{i+4} = f(x_{i+4})$ | 1 | $\hat{y}_{i+4} = \frac{1}{3}(f(x_{i+3}) + f(x_{i+4}) + f(x_{i+5}))$ | 1 |
| $y_{i+5} = f(x_{i+5})$ | 1 | $\hat{y}_{i+5} = \frac{1}{3}(f(x_{i+4}) + f(x_{i+5}) + f(x_{i+6}))$ | 1 |

As shown in FIG. 6, the difference $(y_{k+1}-y_k)$ between the original output value $y_{k+1}$ and the output value $y_k$ which is one division prior thereto is indicated by "1", "1", "2", "1", "1" in the above table, and tone jumps are developed because the differences increase discretely. When "−1", "0", "1" are generated as random-number data with a ⅓ probability each and added to the original output values, the output values with the random-number data added thereto are statistically equal to the sum of output values relative to variations of input values and those multiplied by a generation probability. The random-number data "−1" signifies a reduction by 1 of the input value, and the random-number data "1" signifies an increase by 1 of the input value.

The difference $(\hat{y}_{k+1}-\hat{y}_k)$ between the output value $\hat{y}_{k+1}$ (with the random number added) and the output value $\hat{y}_k$ (with the random number added) is indicated by "4/3", "4/3", "4/3", "1", "1" in the above table. Therefore, the discrete value at a certain point in the input vs. output characteristics which is represented by the difference "2" in the case where no random-number data is added is distributed uniformly over certain data points, thereby suppressing tone jumps. As a consequence, even though the duration of each quantizing step in the A/D converter in the image input device 1 remains the same, the net result is equivalent to a reduction in the quantizing step duration, and hence digital image data with a reduced quantizing step duration is supplied to the image processor 4.

An image processing apparatus according to a second embodiment of the present invention will be described below with reference to FIG. 3.

In the second embodiment, the values (intensities) of random numbers to be added to the digital output data from the image input device depend on the digital output data from the image input device.

The image processing apparatus according to the second embodiment, generally designated by the reference numeral 51, differs from the image processing apparatus 5 shown in FIG. 1 in that it additionally includes a look-up table (LUT) 7 for storing coefficient data corresponding to the signal levels of the output data from the image input device 1 (see FIG. 1), and a multiplier 8 for multiplying random-number data outputted from the random-number generator 3 by coefficient data read from the LUT 7. Based on the output data from the image input device 1, the LUT 7 is searched for coefficient data corresponding to the output data from the image input device 1. Then, the multiplier 8 multiplies random-number data outputted from the random-number generator 3 by the coefficient data, and delivers resultant product output data, rather than the random-number data itself from the random-number generator 3, to the adder 2.

The addition of random-number data has the effect of rendering the tone jump difficult to recognize, but it simultaneously has the effect of increasing roughness. Thus, the addition should be suppressed to the necessary minimum corresponding to entire or partial characteristics of an image.

The correction coefficient stored in LUT 7 is a multiplication coefficient to perform correction so that the multiplication value of random-number data is made small at image portions in which the roughness of an image is noticeable and the tone jump is indistinctive, such as at image portions having large density level values, while the multiplication value of random-number data is made large at image portions in which the tone jump is more noticeable than the roughness.

The correction coefficient value stored in LUT 7 is prepared as follows.

Samples are prepared for respective manuscripts for either transparency or reflection, in which each of the density levels of Y, M, C, and K is changed, and the correction coefficient to be multiplied with an additional random signal is changed, in order to visually evaluate the tone jump and the roughness. Results of the evaluation are used to select a minimum correction coefficient value with which the both of the tone jump and the roughness are acceptable with respect to each of the density levels.

Figure 7:
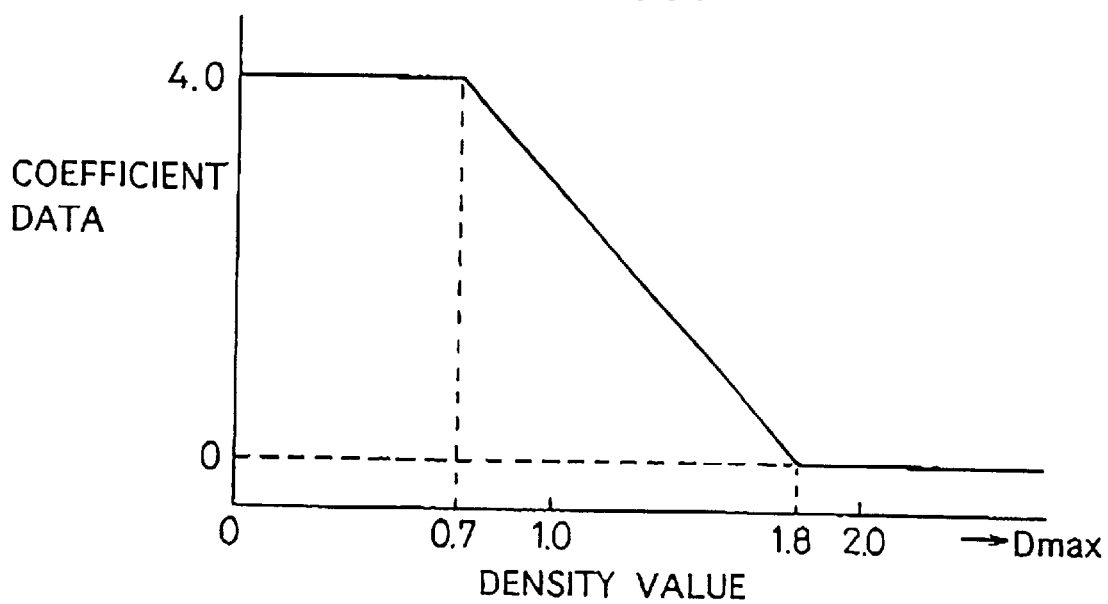
FIG. 7 is a diagram illustrative of a relationship between correction data and density level according to an embodiment of the invention.

An example of the relationship between the correction coefficient and the density level thus obtained is shown in FIG. 7. As shown in FIG. 7, the function desirably has a shape so that the correction coefficient is constant at image portions in which the density level is low, while the correction coefficient decreases as the density level becomes high after the density level exceeds a certain value.

The coefficient data stored in the LUT 7 comprises floating point numbers. The multiplier 8 outputs an integral part of the product of the random-number data and the coefficient data to the adder 2, which adds the supplied data to the output data from the image input device 1. The adder 2 limits any overflow in the same manner as described above with respect to the first embodiment.

In the second embodiment, as described above, coefficient data is read from the LUT 7 based on the level of the output data from the image input device 1 and multiplied by random-number data outputted from the random-number generator 3, and the product data is added to the output data from the image input device 1. Accordingly, in a shadow area of the image, for example, the magnitude of a variation caused by the random-number data, i.e., the magnitude of a change in the value of the output data from the adder 2, may be limited to a small range.

In a higher-density image area, the image tends to get sandy and rough particularly in a shadow area, and hence any tone jumps are liable to be less conspicuous. By multiplying the random-number data outputted from the random-number generator 3 by the coefficient data, therefore, it is possible to reduce the effect of the random-number data on images that are less subject to tone jumps and increase the effect of the random-number data on images that are more subject to tone jumps.

Figure 4:
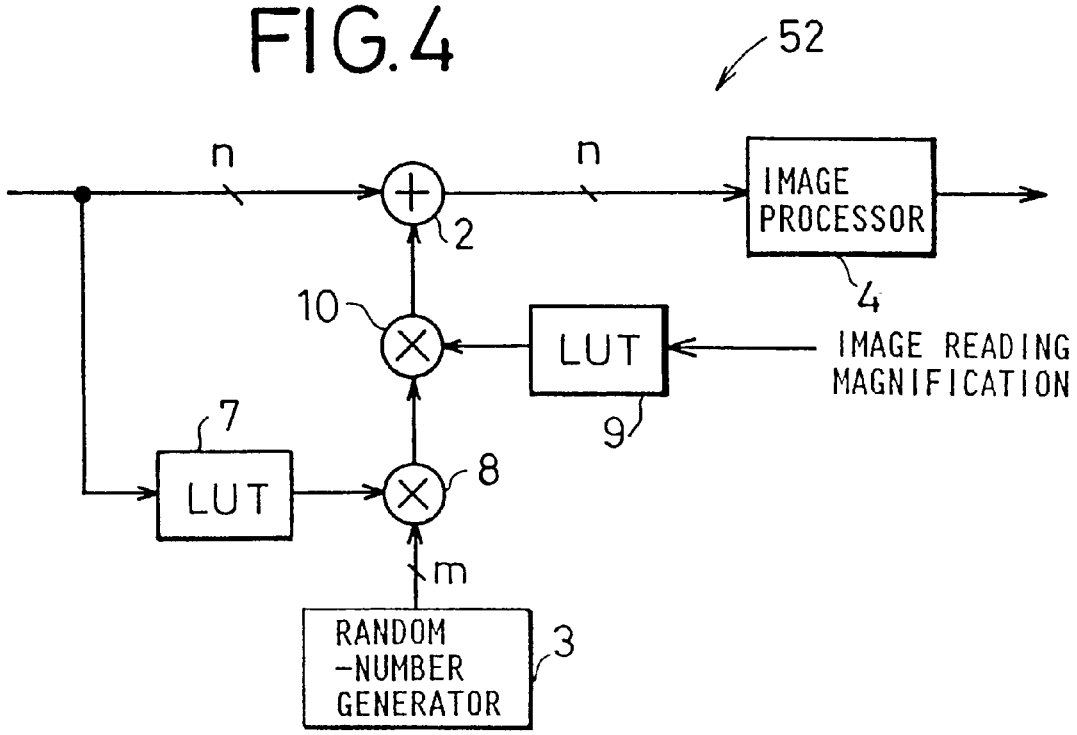
FIG. 4 is a block diagram of an image processing apparatus according to a third embodiment of the present invention.

FIG. 4 shows an image processing apparatus according to a third embodiment of the present invention.

Figure 3:
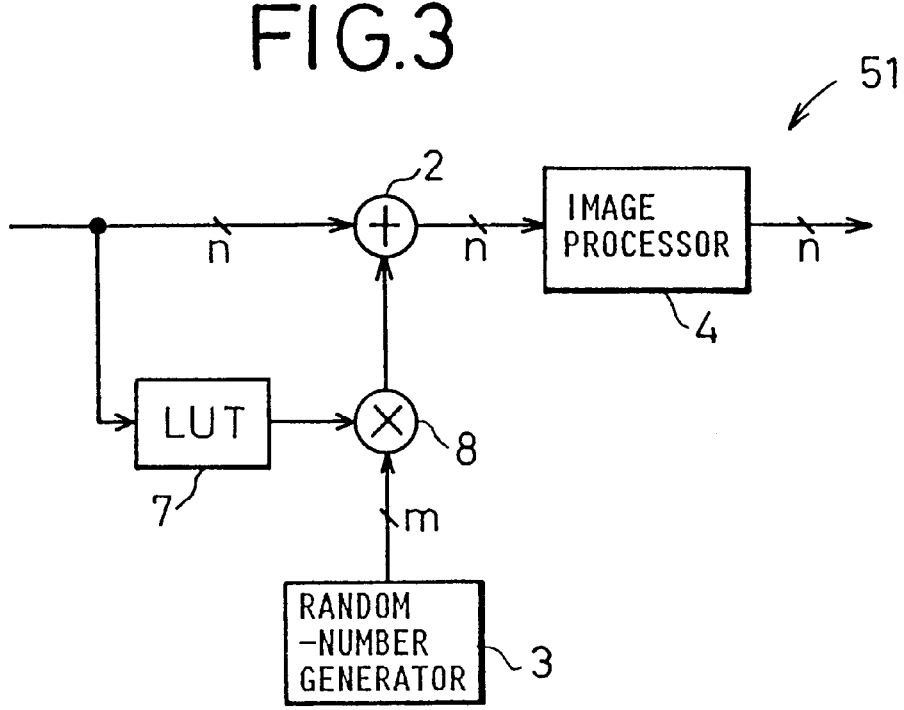
FIG. 3 is a block diagram of an image processing apparatus according to a second embodiment of the present invention.

The image processing apparatus, generally designated by the reference numeral 52, according to the third embodiment differs from the image processing apparatus 51 shown in FIG. 3 in that it additionally includes a look-up table (LUT) 9 for storing coefficient data corresponding to the image reading magnification with which the image is read by the image input device 1 (see FIG. 1), and a multiplier 10 for multiplying output data from the multiplier 8 by coefficient data read from the LUT 9. The multiplier 10 multiplies the output data from the multiplier 8 by the coefficient data read from the LUT 9, and delivers resultant product output data, rather than the output data itself from the multiplier 8, to the adder 2.

The correction coefficient stored in LUT 9 is a multiplication coefficient to perform correction so that the multiplication value of random-number data is made small when the roughness of an image is noticeable and the tone jump is indistinctive such as when the reading magnification is large, while the multiplication value of random-number data is made large when the tone jump is more noticeable than the roughness.

The correction coefficient value stored in LUT 9 is prepared as follows.

Samples are prepared for respective manuscripts for either transparency or reflection, in which each of the density levels of Y, M, C, and K and the reading magnification are changed in combination, and the correction coefficient to be multiplied by an additional random signal is changed, in order to visually evaluate the tone jump and the roughness. Results of the evaluation are used to select a minimum correction coefficient value with which the both of the tone jump and the roughness are acceptable with respect to the combination of each of the density levels and the reading magnification.

Figure 8:
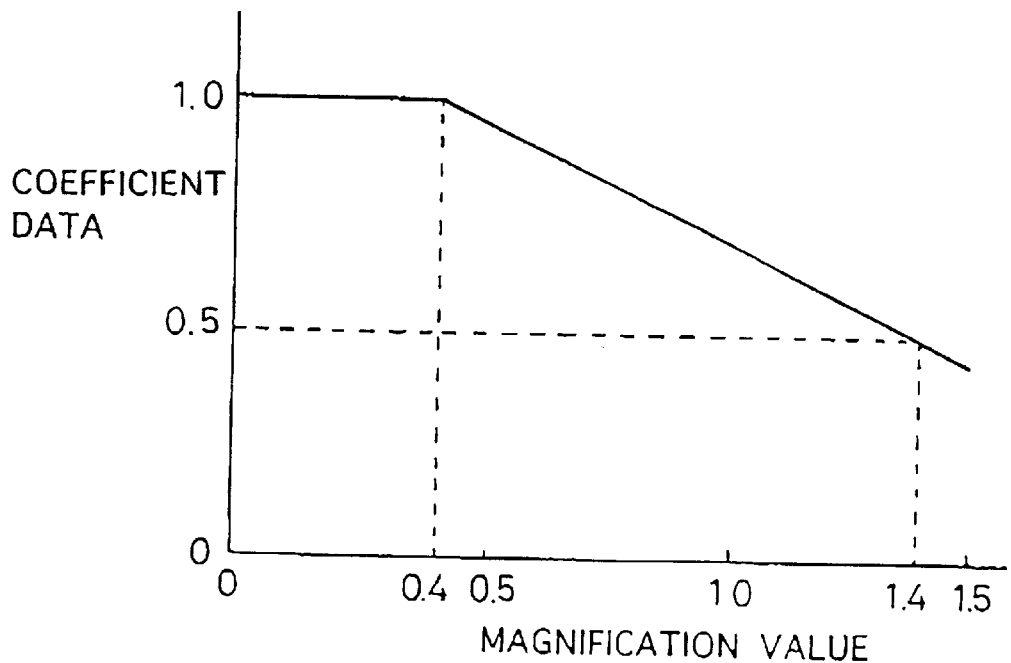
FIG. 8 is a diagram illustrative of a relationship between coefficient data and reading magnification according to an embodiment of the invention.

An example of the relationship between the correction coefficient and the reading magnification (the density level is constant) thus obtained is shown in FIG. 8. As shown in FIG. 8, the function desirably has a shape so that the correction coefficient decreases as the reading magnification becomes large after the reading magnification exceeds a certain value.

The greater the image reading magnification of the image input device 1, the greater the tendency of the image input device 1 to pick up the granular nature of the image on the document being read. Therefore, the LUT 9 stores coefficient data which are of values that become smaller as the image reading magnification value becomes larger.

In the third embodiment, as described above, coefficient data based on the image reading magnification of the image input device 1 is read from the LUT 9, and multiplied by output data from the multiplier 8 by the multiplier 10, which applies output data to the adder 2. Therefore, the output data With the effect thereon of random number data being reduced based on the output data from the image input device 1 is corrected based on the image reading magnification of the image input device 1. The corrected output data is added to the output data from the image input device 1 by the adder 2, and the sum output data is supplied to the image processor 4 for image processing.

As a consequence, when the image reading magnification is larger, any tone jumps are less conspicuous, and hence the output data from the multiplier 8 is multiplied by smaller coefficient data from the LUT 9, with the result that the magnitude of a variation caused by the random-number data from the random-number generator 3 is limited to a smaller value. Conversely, when the image reading magnification is smaller, any tone jumps are more conspicuous, and hence the output data from the multiplier 8 is multiplied by larger coefficient data from the LUT 9, with the result that the magnitude of a variation caused by the random-number data from the random-number generator 3 is limited to a larger value, thus suppressing the tone jumps.

Figure 5:
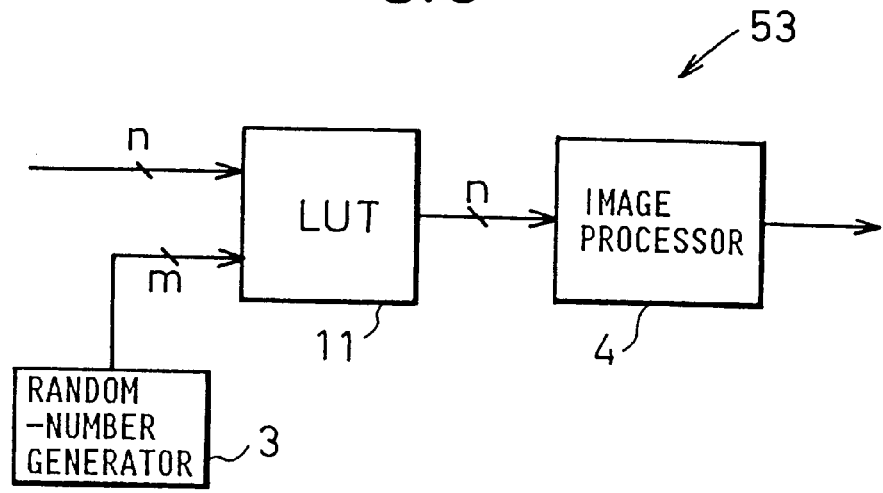
FIG. 5 is a block diagram of an image processing apparatus according to a fourth embodiment of the present invention.

According to a fourth embodiment of the present invention as shown in FIG. 5, an image processing apparatus 53 is similar to the image processing apparatus 5 shown in FIG. 1 except that the adder 2 shown in FIG. 1 is replaced with a look-up table (LUT) 11 which is supplied with output data from the image input device 1 (see FIG. 1) and random-number data from the random-number generator 3, and data read from the LUT 11 is delivered to the image processor 4.

The LUT 11 stores data, which may represent, for example, the results of multiplications carried out by the multiplier 8 (see FIG. 3) and additions carried out by the adder 2 (see FIG. 3), depending on the output data from the image input device 1 and the random-number data from the random-number generator 3. In operation, based on the output data from the image input device 1 and the random-number data from the random-number generator 3, stored data is read from the LUT 11 and supplied to the image processor 4 for image processing.

In the fourth embodiment, since the data stored in the LUT 11 represent the results of multiplications carried out by the multiplier 8 (see FIG. 3) and additions carried out by the adder 2 (see FIG. 3), the image processing apparatus 53 does not suffer limitations which would otherwise be imposed on the number of bits produced upon multiplications due to hardware limitations, and hence the accuracy of calculations can be increased.

While the LUT 11 in the fourth embodiment stores data representative of the results of multiplications carried out by the multiplier 8 and additions carried out by the adder 2 according to the second embodiment, the LUT 11 may store the same data as corrected by the image reading magnifications according to the third embodiment.

Although certain preferred embodiments of the present invention has been shown and described in detail, it should be understood that various changes and modifications may be made therein without departing from the scope of the appended claims.

What is claimed is:

1. A method of processing a digitized image signal, comprising the steps of:

scanning an image on an original to obtain the digitized image signal;

generating input digital image data from the digitized image signal, said input digital image data corresponding to substantially the entire said digitized image signal;

generating random-number data;

multiplying said random-number data by first coefficient data stored in a first look up table and a second coefficient data stored in a second look up table to obtain a corrected random number data;

said first coefficient data being a function of the input digital image data, said first coefficient data having a value which becomes smaller as a density value of said image becomes higher;

said second coefficient data being a function of an image reading magnification value with which said input digital image data is read, said second coefficient data having a value which becomes smaller as said magnification becomes higher;

adding said input digital image data and said corrected random-number data to obtain sum data; and processing the sum data.

2. An apparatus for processing a digitized image signal, comprising:

an image input device for generating input digital image data which corresponds to substantially the entire said image;

a random number generator for generating random-number data;

a first look up table for storing first coefficient generated being a function of the input digital image data, said first coefficient data having a value which becomes smaller as a density value of said image becomes higher;

a second look up table for storing second coefficient data generated being a function of an image reading magnification value with which said input digital image data is read, said second coefficient data having a value which becomes smaller as said magnification value becomes higher;

a first multiplier for multiplying the random-number data by the first coefficient data to obtain first corrected random-number data;

a second multiplier for multiplying the first corrected random-number data by the second coefficient data to obtain second corrected random-number data;

an adder for adding said input digital image data and said second corrected random-number data to obtain sum data; and an image processor for processing the sum data from said adder.

* * * * *